US012677295B2

(12) United States Patent
Kasan et al.

(10) Patent No.: US 12,677,295 B2
(45) Date of Patent: Jul. 7, 2026

(54) COMPACT DOWNLINK CONTROL INFORMATION SIZE ALIGNMENT

(71) Applicant: Nokia Technologies Oy, Espoo (FI)

(72) Inventors: Karim Kasan, Massy (FR); Nhat-Quang Nhan, Reims (FR); Majed Saad, Massy (FR); Amir Mehdi Ahmadian Tehrani, Munich (DE); Marco Maso, Issy les Moulineaux (FR); Alessio Marcone, Munich (DE)

(73) Assignee: Nokia Technologies Oy, Espoo (FI)

( * ) Notice: Subject to any disclaimer, the term of this patent is extended or adjusted under 35 U.S.C. 154(b) by 287 days.

(21) Appl. No.: 18/626,470

(22) Filed: Apr. 4, 2024

(65) Prior Publication Data
US 2024/0340917 A1 Oct. 10, 2024

Related U.S. Application Data

(60) Provisional application No. 63/494,837, filed on Apr. 7, 2023.

(51) Int. Cl.
| | |
|---|---|
| *H04W 72/232* | (2023.01) |
| *H04L 1/00* | (2006.01) |
| *H04L 5/00* | (2006.01) |
| *H04W 72/044* | (2023.01) |

(52) U.S. Cl.
CPC ......... *H04W 72/232* (2023.01); *H04L 1/0061* (2013.01); *H04L 5/0007* (2013.01); *H04W 72/044* (2013.01)

(58) Field of Classification Search
CPC .............. H04W 72/232; H04W 72/044; H04L 1/0061; H04L 5/0007; H04L 1/0041; H04L 5/0053; H04L 5/0094; H04L 1/0072

USPC .......................................................... 370/330
See application file for complete search history.

(56) References Cited

U.S. PATENT DOCUMENTS

| | | | |
|---|---|---|---|
| 2021/0099973 A1* | 4/2021 | Islam .................... H04L 1/1896 |
| 2023/0079566 A1 | 3/2023 | Luo et al. |
| 2023/0118018 A1* | 4/2023 | Guo ...................... H04L 1/0069 |
| | | | 370/328 |

(Continued)

OTHER PUBLICATIONS

"Summary #4 on dynamic switching between DFT-S-OFDM and CP-OFDM", 3GPP TSG RAN WG1 #112, R1-2302222, Interdigital Inc. Agenda Item: 9.14.3, Feb. 27-Mar. 3, 2023, 36 pages.

(Continued)

*Primary Examiner* — Marnie A Matt
(74) *Attorney, Agent, or Firm* — Lippes Mathias LLP

(57) ABSTRACT

A method includes receiving, from a network element, a first downlink control information (DCI) message, wherein the first DCI message comprises a plurality of DCI fields. The method also includes determining a first radio network temporary identifier (RNTI) type of a first RNTI that is used for scrambling cyclic redundancy check (CRC) bits of the first DCI message. The method also includes determining a waveform type indicated by a second DCI message, wherein the second DCI message is a most recent DCI message received by the apparatus prior to the first DCI message, and wherein CRC bits of the second DCI message are scrambled by a second RNTI, and wherein the second RNTI is a cell RNTI (C-RNTI). The method also includes decoding the first DCI message based at least in part on the first RNTI type and the waveform type.

20 Claims, 7 Drawing Sheets

(56)          References Cited

U.S. PATENT DOCUMENTS

2024/0306187 A1 *  9/2024  Lin ................... H04W 74/0836
2024/0340917 A1 * 10/2024  Kasan ................... H04L 1/0061
2025/0233693 A1 *  7/2025  Awad ................... H04L 1/1671

OTHER PUBLICATIONS

"3rd Generation Partnership Project; Technical Specification Group
Radio Access Network; NR; Multiplexing and channel coding
(Release 17)", 3GPP TS 38.212 V17.4.0, Dec. 2022, pp. 1-22.
Extended European Search Report received for corresponding Euro-
pean Patent Application No. 24168407.5, dated Sep. 10, 2024, 11
pages.
"Dynamic switching between DFT-s-OFDM and CP-OFDM", 3GPP
TSG RAN WG1 #112-bis-e, R1-2302882, Nokia Agenda item:
9.12.3, Apr. 17-26, 2023, 22 pages.

* cited by examiner

300

302 DCI ID | ... | 304a WDF #1 | 304b WDF #2 | 306 NDI | 308 DWS | ... | 304m WDF #M | ... | 310 LAST DCI FIELD

*MOST RECENT DCI scrambled by C-RNTI indicating CP-OFDM*

301

302 DCI ID | ... | 304a WDF #1 | 312a ZEROS | 304b WDF #2 | 312b ZEROS | 306 NDI | 308 DWS | ... | 304m WDF #M | 312c ZEROS | ... | 310 LAST DCI FIELD

*Current DCI scrambled by CS-RNTI with NDI = 0 and RRC configured DFT-S-OFDM or with NDI = 1 and DWS field indicates DFT-S-OFDM*

400

*MOST RECENT DCI scrambled by C-RNTI indicating DFT-S-OFDM*

401

*Current DCI scrambled by CS-RNTI with NDI = 0 and RRC configured CP-OFDM or with NDI = 1 and DWS field indicates CP-OFDM*

COMPACT DOWNLINK CONTROL INFORMATION SIZE ALIGNMENT

The present application is based on and claims priority to U.S. Provisional Application Ser. No. 63/494,837, filed Apr. 7, 2023, which is incorporated herein by reference in its entirety.

TECHNICAL FIELD

An example embodiment of the present disclosure generally relates to communication systems and, more particularly, to methods for aligning downlink control information (DCI) based on a particular DCI format.

BACKGROUND

Third generation partnership project (3GPP) 5th generation (5G) technology is a next generation of radio systems and network architecture that can deliver extreme broadband and ultra-robust, low latency connectivity. 5G technology improves a variety of telecommunication services offered to the end users and supports massive broadband that delivers gigabytes of bandwidth per second on demand for the uplink and downlink transmissions. As one example, next generation communication systems may be configured to use virtualized radio access network (RAN) functions and core network functions. As another example, next generation systems may use a Service Based Architecture (SBA), e.g., a system architecture in which the system functionality is achieved using a set of Network Functions (NFs) providing services to other NFs authorized to access their services. The 5G network may be configured to support NFs via a Network Repository Function (NRF). For example, an NRF may be configured to maintain a list of available NFs to facilitate service registration and/or discovery in an instance in which a user equipment (UE) attempts to access one or more services provided by one or more network devices.

In order to serve multiple UEs in a particular network cell, 3GPP 5G (and beyond) communication systems employ downlink control information (DCI). DCI messages, also known as DCI payloads, comprise control information that is used for scheduling physical resources for downlink and uplink transmissions between one or more UEs and a particular RAN node (e.g., such as a gNB) serving a particular network cell. As multiple DCI messages can have various respective payload sizes based at least in part on dynamic waveform switching (DWS) between discrete Fourier transform spread orthogonal frequency division multiplexing (DTF-S-OFDM) and cyclic prefix OFDM (CP-OFDM), the DCI payload sizes must be aligned to case DCI decoding by a UE.

SUMMARY

Methods, apparatuses, and computer program products are provided in accordance with an example embodiment for providing compact downlink control information (DCI) size alignment.

In accordance with a first aspect of the present disclosure, a computer-implemented method is provided. The computer-implemented method is performable by one or more specially configured computing device(s) embodied in hardware, software, firmware, and/or any combination thereof, for example as described herein. In one example embodiment, a computer-implemented method includes receiving, from a network element, a first downlink control information (DCI) message, wherein the first DCI message comprises a plurality of DCI fields. The computer-implemented method also includes determining a first radio network temporary identifier (RNTI) type of a first RNTI that is used for scrambling cyclic redundancy check (CRC) bits of the first DCI message. The computer-implemented method also includes determining a waveform type indicated by a second DCI message, wherein the second DCI message is a most recent DCI message received by the apparatus prior to the first DCI message, and wherein CRC bits of the second DCI message are scrambled by a second RNTI, and wherein the second RNTI is a cell RNTI (C-RNTI). The computer-implemented method also includes decoding the first DCI message based at least in part on the first RNTI type and the waveform type.

The computer-implemented method further includes where decoding the first DCI message comprises determining the size of one or more waveform dependent fields (WDFs) associated with the first DCI message, wherein the WDFs are comprised in the plurality of DCI fields associated with the first DCI message.

The computer-implemented method further includes where decoding the first DCI message comprises identifying one or more portions of zero-padded bits associated with the first DCI message.

The computer-implemented method further includes where decoding the first DCI message further comprises determining whether at least one of the one or more WDFs is partitioned into two parts.

The computer-implemented method further includes, in response to determining that the CRC bits of the first DCI message are scrambled by a C-RNTI, determining that the respective position of the one or more portions of zero-padded bits is located after a last DCI field of the first DCI message.

The computer-implemented method further includes in response to determining that the CRC bits of the first DCI message are scrambled by a configured scheduling radio network temporary identifier (CS-RNTI), determining the second DCI message, wherein the second DCI message is a most recent DCI message received by the apparatus prior to the first DCI message, and wherein the CRC bits of the second DCI message are scrambled by a C-RNTI. The computer-implemented method also includes, in response to determining the second DCI message, determining the waveform type indicated by the second DCI message.

The computer-implemented method further includes, in response to determining that the waveform type indicated by the second DCI message is a cyclic prefix-orthogonal frequency division multiplexing (CP-OFDM) waveform, determining that the respective position of each of the one or more portions of zero-padded bits are located after a respective DCI field of the plurality DCI fields associated with the first DCI message.

The computer-implemented method further includes, in response to determining that the waveform type indicated by the second DCI message is a discrete Fourier transform spread orthogonal frequency division multiplexing (DFT-S-OFDM) waveform, determining that a DCI field of the plurality of DCI fields is a new data indicator (NDI) field, wherein the NDI field indicates whether the first DCI message is an activation for a configured transmission or a retransmission, and wherein a location of the NDI field in the plurality of DCI fields associated with the first DCI message is determined by assuming that sizes of the WDFs located before the NDI field in the first DCI message are of the same sizes of respective WDFs located before an NDI field in the second DCI message associated with DFT-S-OFDM waveform. The computer-implemented method also includes determining that a DCI field of the plurality of DCI fields is a DWS field, wherein the DWS field indicates a respective waveform type of a transmission associated with the first DCI message. The computer-implemented method also includes determining, based in part on the NDI field and the respective waveform type indicated by the DWS field, the waveform type of the transmission associated with the first DCI message. The computer-implemented method also includes, in response to determining that the waveform type of the transmission associated with the first DCI message is CP-OFDM, determining whether one or more WDFs of the plurality of DCI fields associated with the first DCI message have been partitioned.

The computer-implemented method further includes, in response to determining that the first DCI message is scrambled by a C-RNTI, determining that a DCI field of the plurality of DCI fields is a dynamic waveform switching (DWS) field, wherein the DWS field indicates a respective waveform type of a transmission associated with the first DCI message. The computer-implemented method also includes determining, based in part on the respective waveform type indicated by the DWS field, a respective WDF type associated with each of the WDFs of the plurality of DCI fields associated with the first DCI message. The computer-implemented method also includes determining, based in part on the respective waveform type indicated by the DWS field, a position associated with each of the respective WDFs associated with the first DCI message.

In accordance with a second aspect of the disclosure, an apparatus for providing compact DCI size alignment is provided. In one example embodiment, the apparatus includes at least one or more transceivers and at least one or more processors communicatively coupled to the one or more transceivers. The one or more processors are configured to cause the terminal device to perform any one of the example computer-implemented methods described herein.

In accordance with a third aspect of the disclosure, a computer program product for providing compact DCI size alignment is provided. In one example embodiment, the computer program product includes at least one non-transitory computer-readable storage medium having computer program code instructions stored thereon that, in execution with at least one processor, configures the computer program product for performing any one of the example computer-implemented methods described herein.

In accordance with a fourth aspect of the disclosure, an apparatus for compact DCI size alignment is provided is provided. In one example embodiment apparatus, the apparatus includes means for performing each step of any one of the example computer-implemented methods described herein.

In accordance with a fifth aspect of the disclosure, an apparatus for compact DCI size alignment is provided. The apparatus includes means for determining a first radio network temporary identifier (RNTI) type of a first RNTI that is used for scrambling cyclic redundancy check (CRC) bits of a first DCI message, wherein the first DCI message comprises a plurality of DCI fields. The apparatus also includes means for determining a waveform type indicated by a second DCI message, wherein the second DCI message is a most recent DCI message caused to be transmitted by the apparatus prior to the first DCI message, and wherein the CRC bits of the second DCI message are scrambled by a second RNTI, and wherein the second RNTI is a cell RNTI (C-RNTI). The apparatus also includes means for encoding the first DCI message based at least in part on the first RNTI type and the waveform type. The apparatus also includes means for transmitting the first DCI message.

The apparatus further includes where wherein encoding the first DCI message comprises determining the size of one or more waveform dependent fields (WDFs) associated with the first DCI message, wherein the WDFs are comprised in the plurality of DCI fields associated with the first DCI message.

The apparatus further includes where encoding the first DCI message comprises applying one or more portions of zero-padded bits to the first DCI message.

The apparatus further includes where encoding the first DCI message further comprises partitioning one or more waveform dependent fields (WDFs) into two parts, wherein the WDFs are comprised in the plurality of DCI fields associated with the first DCI message.

The apparatus further includes, in response to determining that the CRC bits of the first DCI message are scrambled by a C-RNTI, means for applying the one or more portions of zero-padded bits after a last DCI field of the first DCI message.

The apparatus further includes, in response to determining that the CRC bits of the first DCI message are scrambled by a configured scheduling radio network temporary identifier (CS-RNTI), means for determining the second DCI message, wherein the second DCI message is a most recent DCI message caused to be transmitted by the apparatus prior to the first DCI message, and wherein the CRC bits of the second DCI message is scrambled by a C-RNTI. The apparatus also includes, in response to determining the second DCI message, means for determining the waveform type indicated by the second DCI message.

The apparatus further includes, in response to determining that the waveform type indicated by the second DCI message is a cyclic prefix-orthogonal frequency division multiplexing (CP-OFDM) waveform, means for applying each of the one or more portions of zero-padded bits after a respective DCI field of the plurality of DCI fields associated with the first DCI message.

The apparatus further includes, in response to determining that the waveform type indicated by the second DCI message is a discrete Fourier transform spread orthogonal frequency division multiplexing (DFT-S-OFDM) waveform, means for determining that a DCI field of the plurality of DCI fields is a new data indicator (NDI) field, wherein the NDI field indicates whether the first DCI message is an activation for a configured transmission or a retransmission, and wherein a location of the NDI field in the plurality of DCI fields associated with the first DCI message is determined by assuming sizes of the WDFs located before the NDI field in the first DCI message are of the same sizes of respective WDFs located before an NDI field in the second DCI message associated with DFT-S-OFDM waveform. The apparatus also includes means for determining that a DCI field of the plurality of DCI fields is a DWS field, wherein the DWS field indicates a respective waveform type of a transmission associated with the first DCI message. The apparatus also includes means for determining, based in part on the NDI field and the respective waveform type indicated by the DWS field, the waveform type of the transmission associated with the first DCI message. The apparatus also includes, in response to determining that the waveform type of the transmission associated with the first DCI message is CP-OFDM, means for determining, based in part on the location of the NDI field, whether one or more of the WDFs associated with the first DCI message are larger than one or more corresponding WDFs associated with the second DCI message. The apparatus also includes, in response to determining that the one or more WDFs associated with the first DCI message are larger than the one or more corresponding WDFs associated with the second DCI message, means for partitioning the one or more WDFs associated with the first DCI message are larger into a first and second respective part. The apparatus also includes means for appending the second part of the respective partitioned WDFs after a last DCI field of the first DCI message.

The above summary is provided merely for the purpose of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject will become apparent from the description, the drawings, and the claims.

BRIEF DESCRIPTION OF THE DRAWINGS

Figure 1:
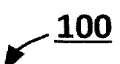
Figure 1:
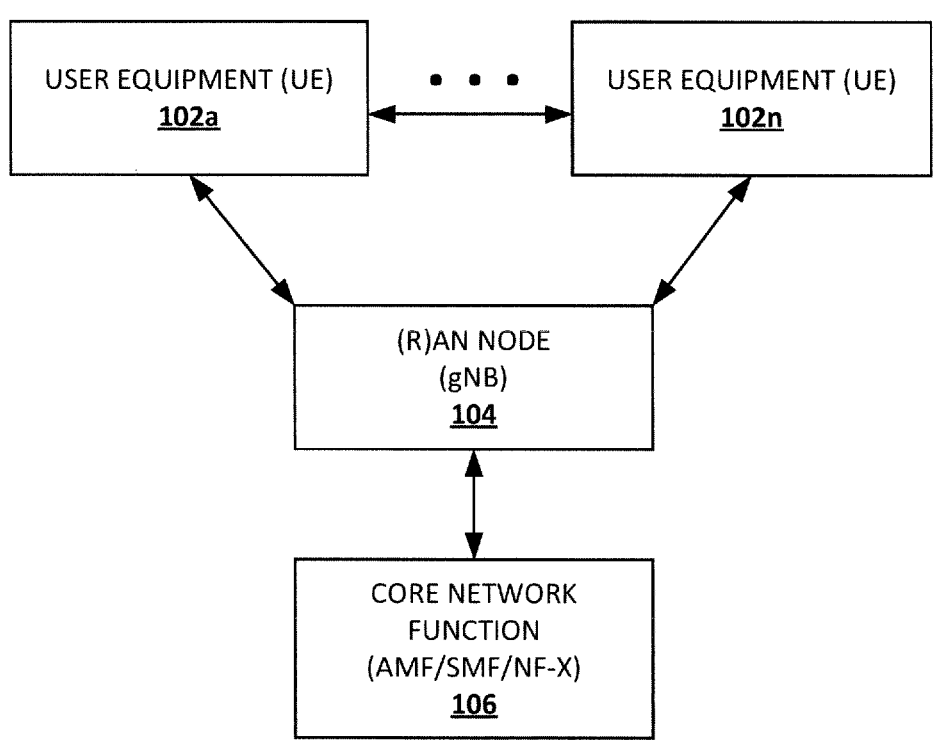
Figure 2:
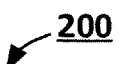
Figure 2:
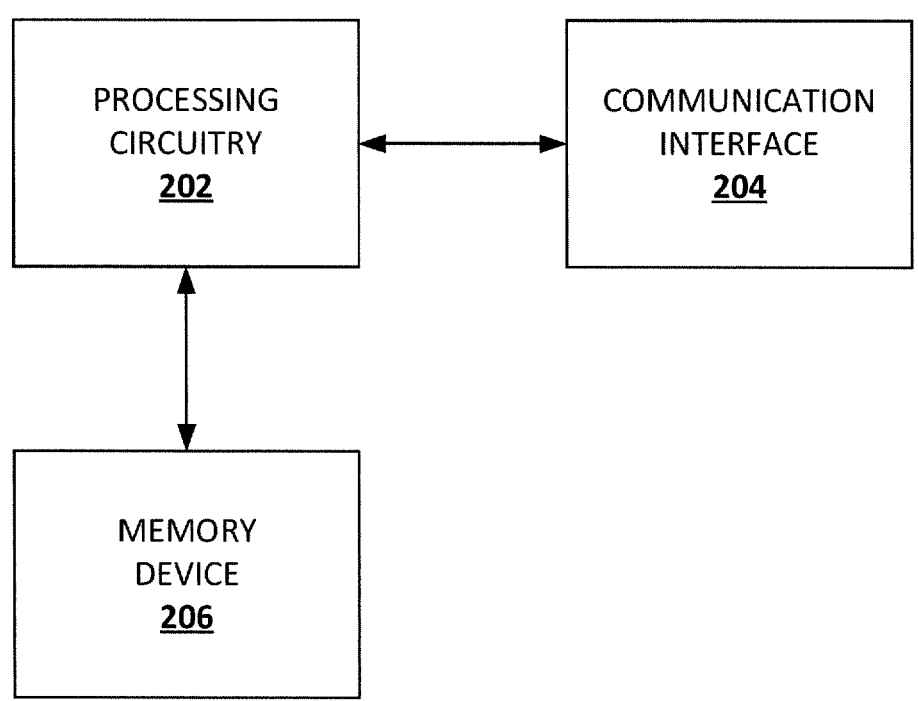
Figures 3A, 3B:
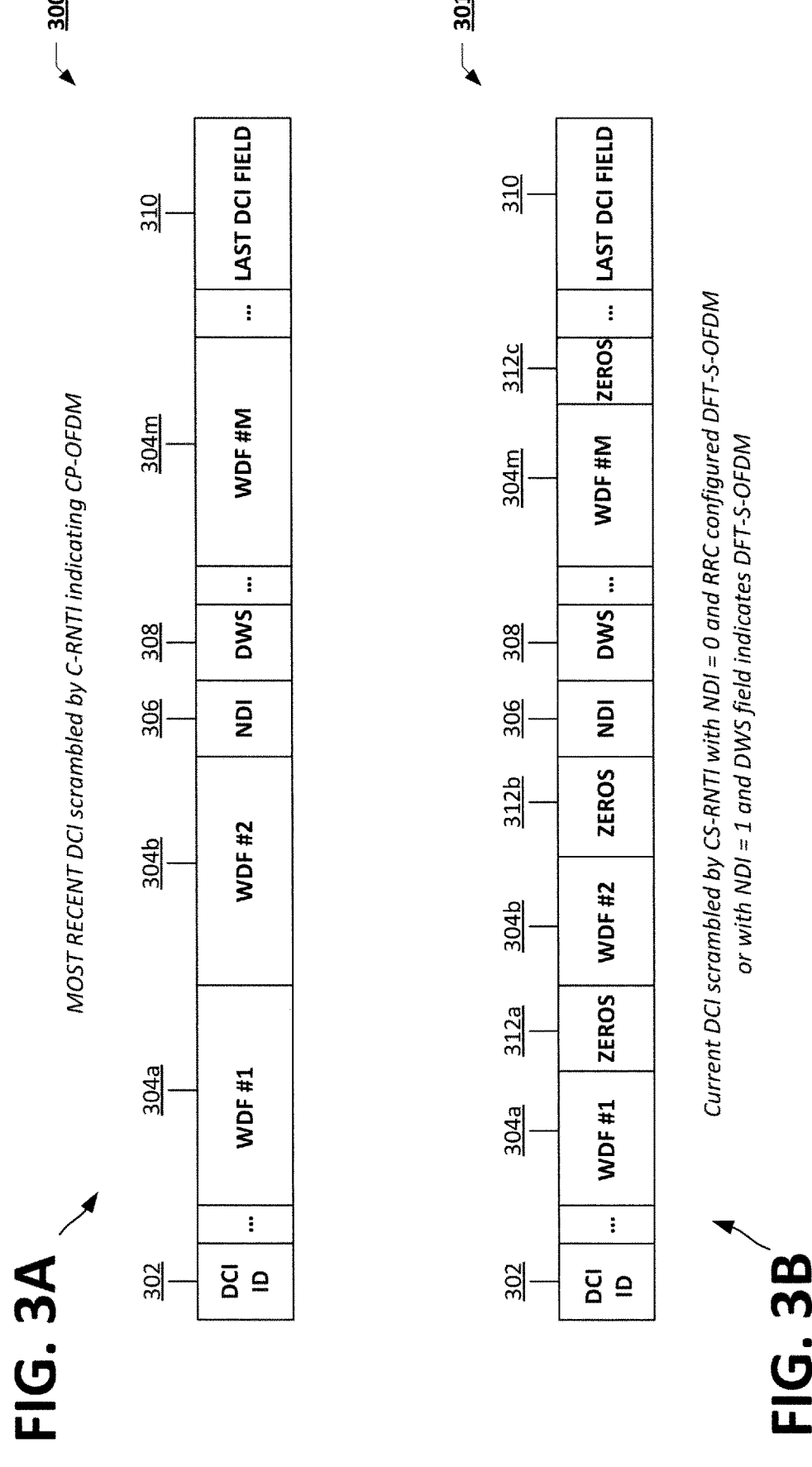
Figures 4A, 4B:
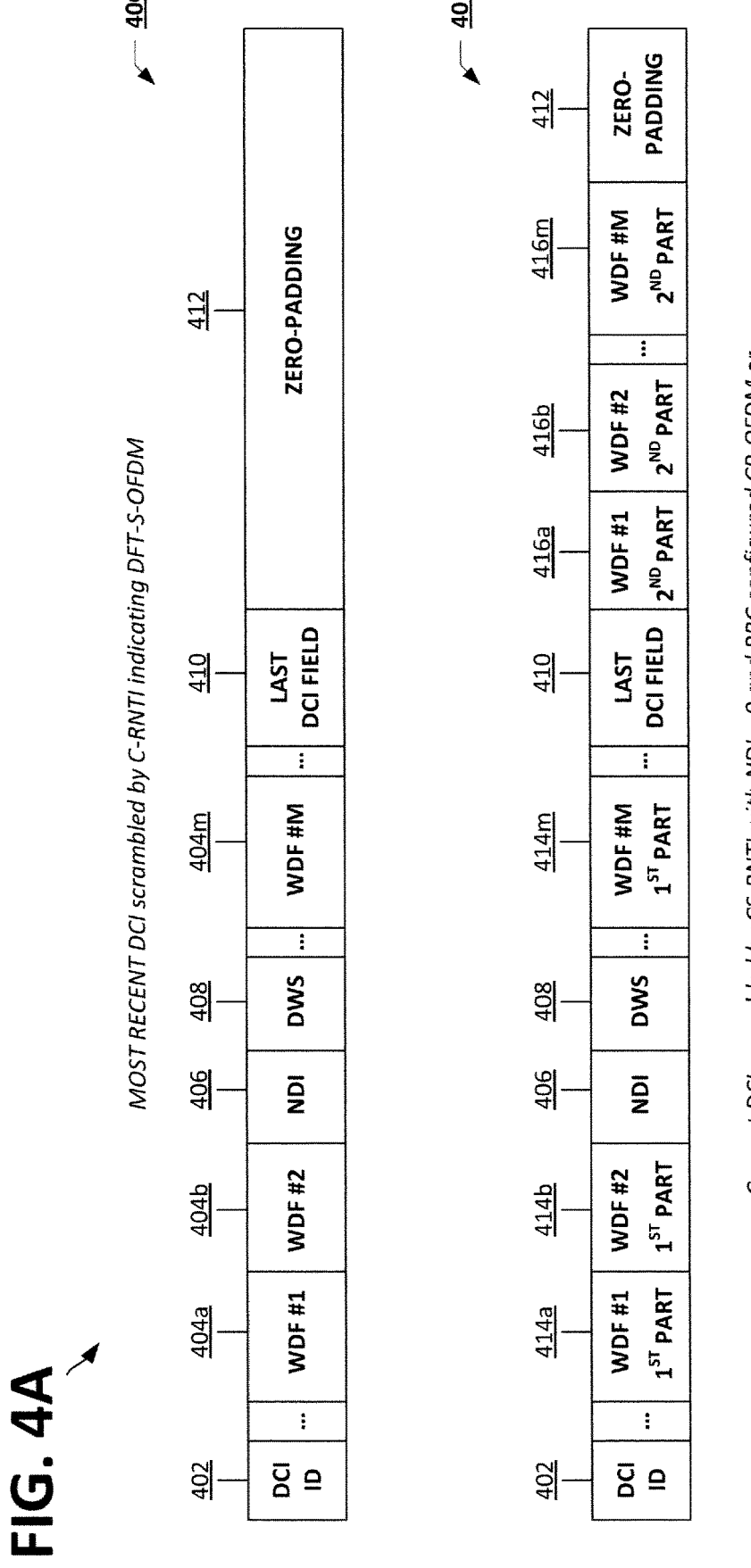
Figure 5A:
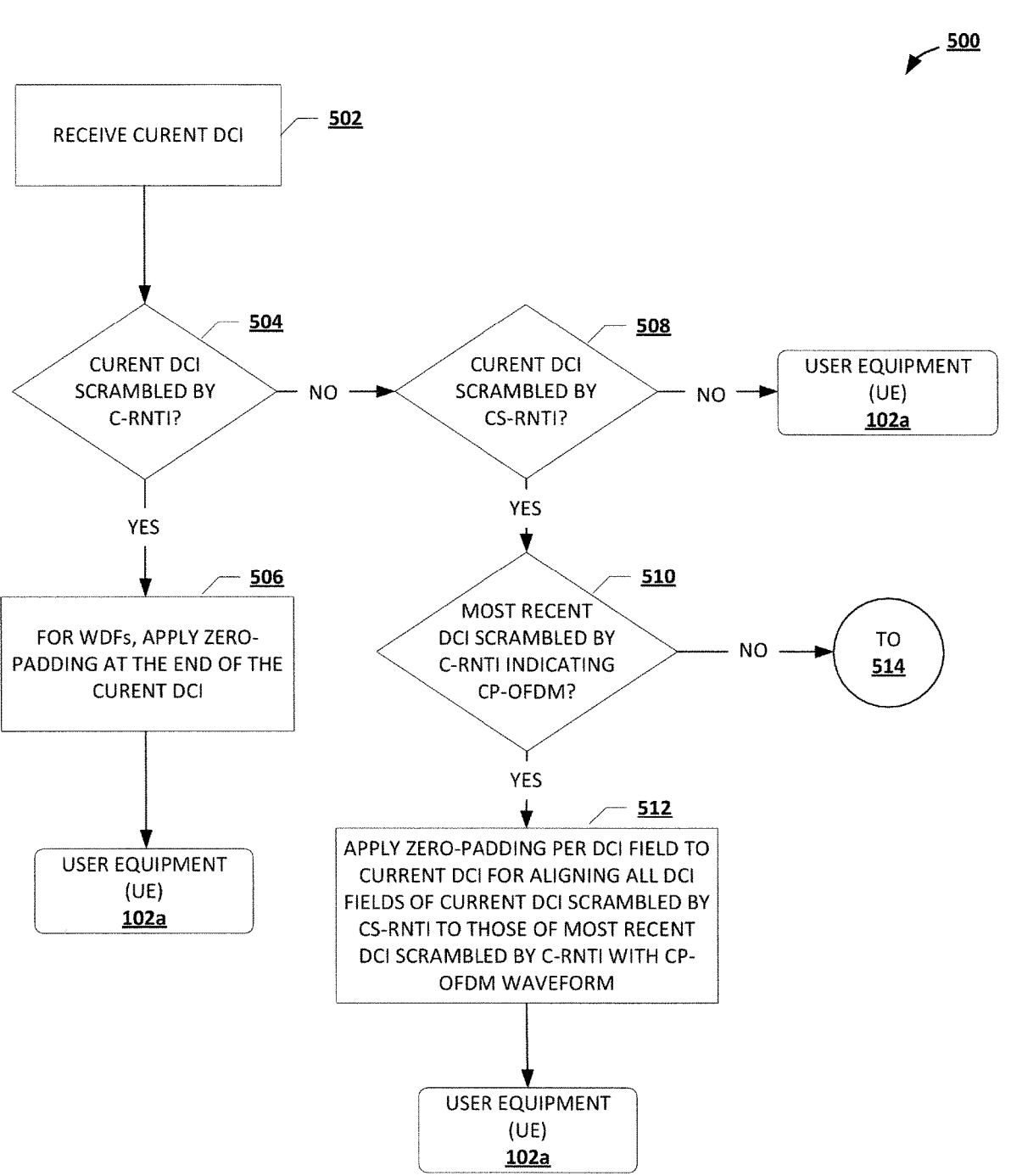
Figure 5B:
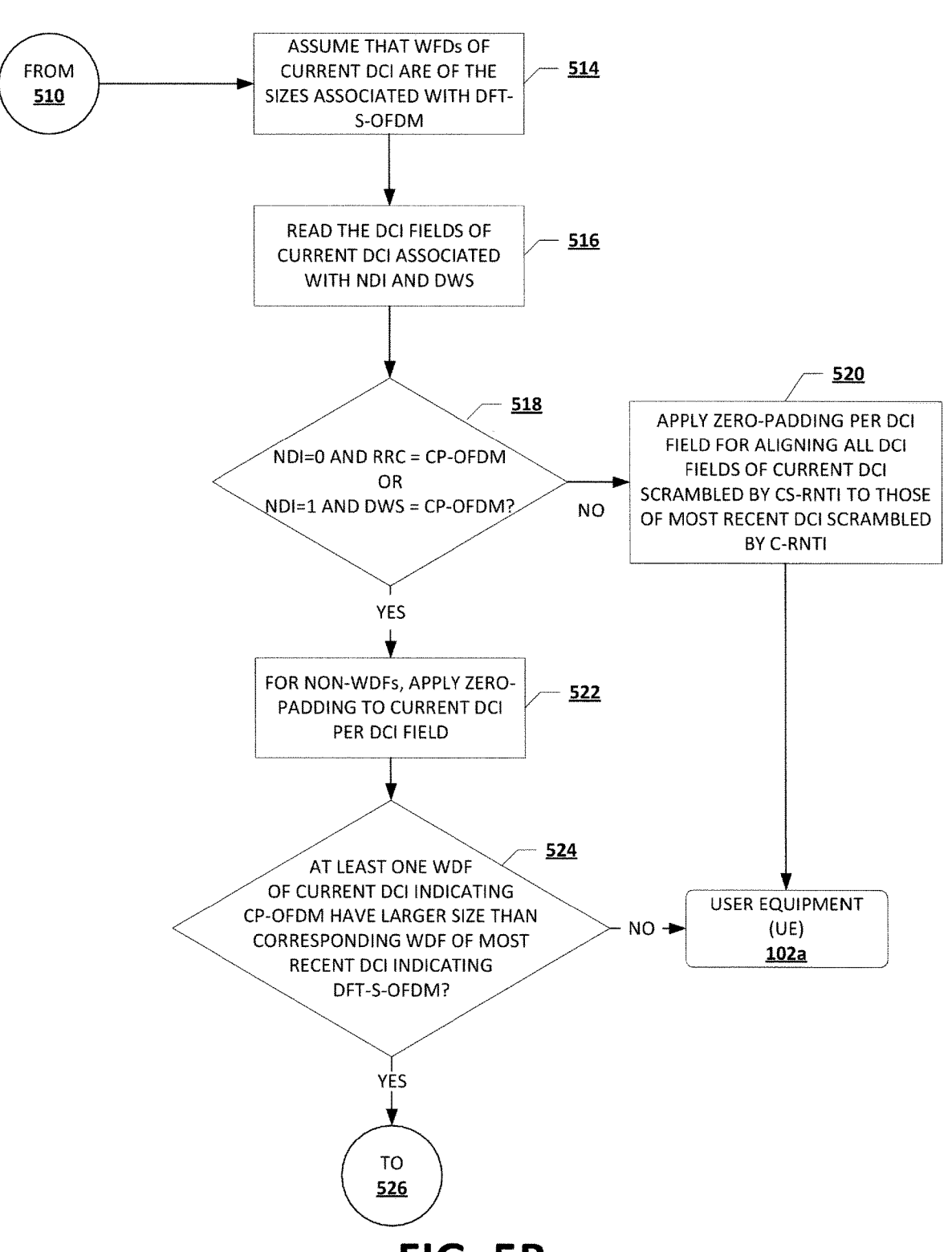
Figure 5C:
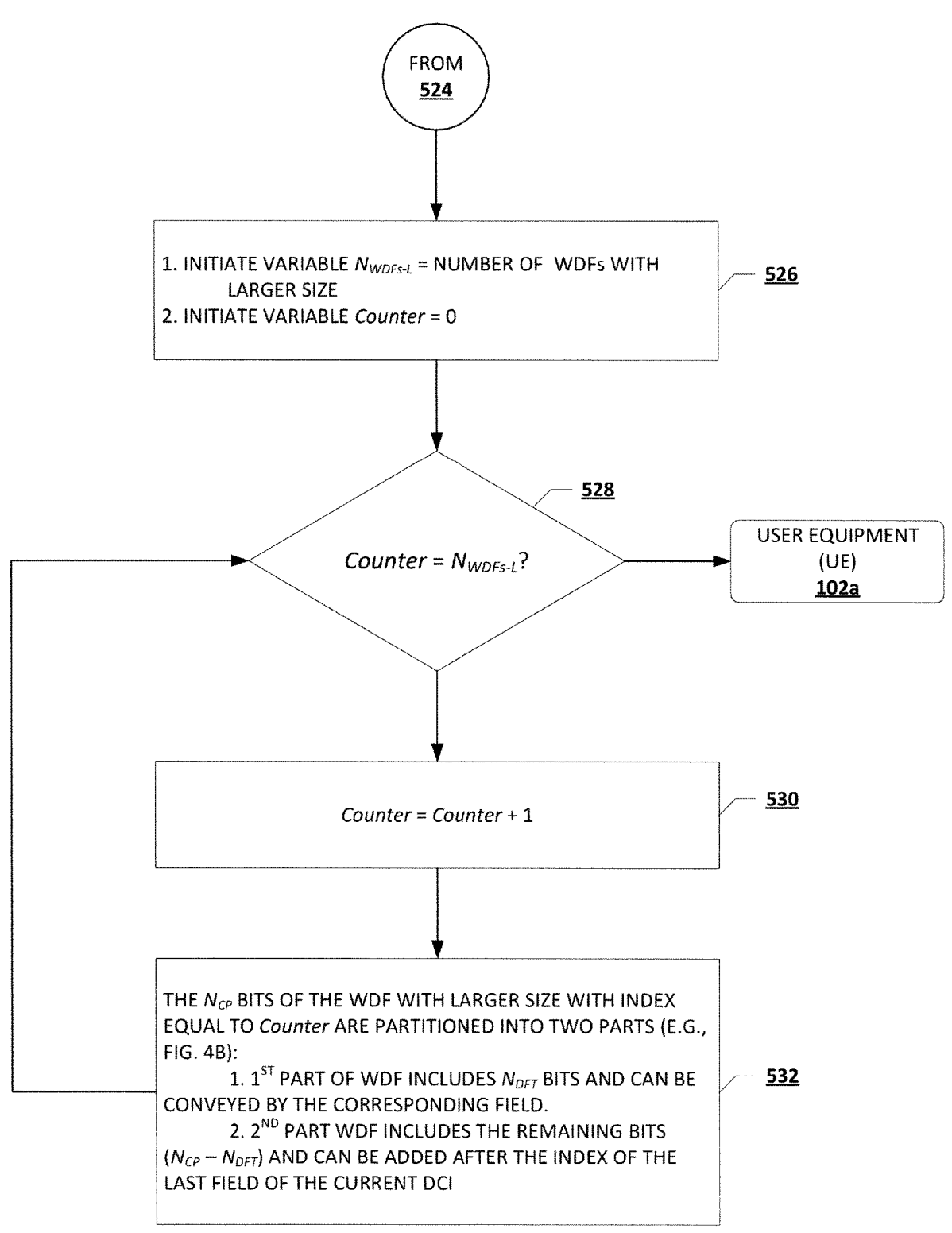

Having thus described certain example embodiments in general terms, reference will now be made to the accompanying drawings, which are not necessarily drawn to scale, and wherein:

FIG. 1 is a block diagram of a communication system configured in accordance with one or more example embodiments of the present disclosure;

FIG. 2 is a block diagram of an apparatus that can be configured to provide compact downlink control information alignment per downlink control information (DCI) format in accordance with one or more example embodiments of the present disclosure;

FIGS. 3A-B illustrate an example of size alignment of two downlink control information (DCI) messages in accordance with one or more example embodiments of the present disclosure;

FIGS. 4A-B illustrate another example of size alignment of two DCI messages configured in accordance with one or more example embodiments of the present disclosure; and FIGS. 5A-C illustrate a flowchart depicting a method for providing compact DCI size alignment in accordance with one or more example embodiments of the present disclosure.

DETAILED DESCRIPTION

Some embodiments of the present disclosure will now be described more fully hereinafter with reference to the accompanying drawings, in which some, but not all, embodiments of the present disclosure are shown. Indeed, various embodiments of the present disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As defined herein, a "computer-readable storage medium," which refers to a physical storage medium (e.g., volatile, or non-volatile memory device), may be differentiated from a "computer-readable transmission medium," which refers to an electromagnetic signal.

Example communication systems, frameworks, and/or associated techniques of the present disclosure may be configured to provide compact downlink control information (DCI) alignment per format. However, it should be understood that the present disclosure is not limited to the particular types of communication systems and/or processes disclosed. For example, although illustrated in the context of wireless cellular systems utilizing 3GPP system elements such as a 3GPP next generation core network, the disclosed embodiments can be adapted in a straightforward manner to a variety of other types of communication systems. Additionally, while the present disclosure may describe certain embodiments in conjunction with a 5G communications system, other embodiments also apply to and comprise other networks and network technologies, such as 3G, 4G, Long Term Evolution (LTE), 6G, etc., without limitation.

In accordance with an illustrative embodiment implemented in a 5G communication system environment, one or more 3GPP standards, specifications, and/or protocols provide further explanation of user equipment (UE) and core network elements/entities/functions and/or operations performed by the UE and the core network elements/entities/functions, e.g., the 3GPP Radio Access Networks (RAN) Working Group 1 (3GPP RANI), the 3GPP RAN 2. Other 3GPP standards, specifications and/or protocols provide other conventional details that one of ordinary skill in the art will realize. However, while illustrative embodiments are well-suited for implementation associated with the above-mentioned 3GPP standards, alternative embodiments are not necessarily intended to be limited to any particular standards.

As described herein, in order to serve multiple UEs in a particular network coverage cell, 3GPP 5G communication systems employ downlink control information (DCI). DCIs, also described herein as DCI messages and/or DCI payloads, comprise control information that is used for scheduling physical resources for downlink and uplink transmissions between one or more UEs and a particular RAN node (e.g., such as a gNB) serving a particular network coverage cell. The DCIs can be configured in various formats which are comprised of various data fields associated with various data including, but not limited to, identifiers (e.g., DCI format identifiers), indicators (e.g., carrier indicators, bandwidth frequency indicators, new data indicators (NDIs)), frequency domain resource assignment (FDRA), precoding information and number of layers, transmitted precoding matrix indicator (TMPI), antenna port indicators, phase tracking reference signal (PTRS)-dedicated demodulation reference signal (DMRS) (PTRS-DMRS) association, and/or DMRS sequence initialization related to the network and/or network element (e.g., a gNB), UEs, communication protocol, and/or physical resources being used to transmit and/or receive data to and/or from one or more UEs and RAN nodes (e.g., a gNB), communicating in a particular network coverage cell.

One or more DCIs can comprise various DCI fields (e.g., data fields) depending on a particular format associated with the one or more DCIs. Furthermore, depending on the particular format, the various DCI fields are associated with a specific number of bits (e.g., a bit-width) with which to convey the information associated with the DCI fields. For example, the value of a particular bit associated with a particular DCI field can configure, (de) activate (e.g., flag), and/or otherwise initialize a particular parameter, variable, and/or the like associated with a particular DCI format. As such, various DCIs can have various payload sizes depending on the format and/or configuration of the various respective DCI fields.

The respective size of a DCI is also impacted based at least in part on the type of waveform used by a particular RAN node (e.g., a gNB) and one or more UEs for transmitting data. Many current networking elements (e.g., various types of RAN node, gNBs, etc.) and many modern UEs can support dynamic waveform switching (DWS) in which the type of waveform used to transmit data can be switched dependent on the circumstances. For example, depending on network conditions, network coverage, equipment capabilities, network density, and/or the like, a particular RAN node (e.g., a gNB) and/or one or more UEs may switch between using a discrete Fourier transform spread orthogonal frequency division multiplexing (DTF-S-OFDM) waveform and a cyclic prefix OFDM (CP-OFDM) waveform. However, the type of waveform directly affects the DCI size according to various configuration parameters and specification rules influenced by the waveform type. When DWS is supported, one of the most significant issues that needs to be solved is DCI size alignment. If the waveform switching is dynamically indicated, then it is unclear to a UE which waveform type (i.e., CP-OFDM or DFT-S-OFDM) is considered for DCI size determination, given that the UE needs to determine DCI size for before knowing the waveform type indicated in the DCI.

As described herein, at least the following DCI fields are considered as waveform dependent fields (WDFs): FDRA, first precoding information and number of layers (TMPI), second precoding information, antenna ports, first PTRS-DMRS association, second PTRS-DMRS association, and/or DMRS sequence initialization.

With reference to the FDRA field, when dynamicSwitch is configured for resourceAllocation in a physical uplink share channel (PUSCH)-config (or ConfiguredGrantConfig for configured grant (CG) Type 2) which indicates that the most significant bit (MSB) of the FDRA field will be used for indicating whether resource allocation (RA) Type 0 or Type 1 should be used. In this scenario, the MSB bit is not used if DFT-S-OFDM is Indicated, since DFT-S-OFDM can only support RA Type 1. In addition, when resourceAllocationType0 is configured for resourceAllocation in PUSCH-config (or ConfiguredGrantConfig for CG Type 2) which indicates that RA Type 0 is used for CP-OFDM (assuming CP-OFDM is configured by the radio resource control (RRC) layer of the 5G network), the UE always assumes FDRA field size associated with RA Type 0. However, DFT-S-OFDM can only support RA Type 1 and the bit length needed for RA Type 0 is much larger than the bit length needed for RA Type 1, which leads to DCI misalignment.

With reference to the TMPI field, the bit-width of the TMPI field depends on waveform type, number of antenna ports, value of maxRank, value of codebookSubset, whether codebook or nonCode Book is configured for txConfig, whether ul-FullPowerTransmission is not configured or configured to fullpower or fullpowerMode2. For one number of antenna ports, the same bit length is used for both cases of CP-OFDM and DFT-S-OFDM if maxRank=1. For other configurations of the above parameters, the bit-width of this field may be different for different waveforms.

With reference to the antenna port field, the bit-width of antenna port field depends on waveform type, value of dmrs-Type, maxLength, modulation scheme, and the value of rank determined according to the SRS resource indicator field if the higher layer parameter txConfig=nonCodebook and according to the TPMI field if the higher layer parameter txConfig=codebook. The same bit-width is used in case of CP-OFDM and DFT-S-OFDM if dmrs-Type=1 and maxLength=2 and only DMRS configuration Type 1 is supported by DFT-s-OFDM. For other configurations of the above parameters, the bit-width of this field may be different for different waveforms.

With reference to the PTRS-DMRS association (and the second PTRS-DMRS association) field, if PTRS-UplinkConfig is not configured in either dmrs-UplinkForPUSCH-MappingTypeA or dmrs-UplinkForPUSCH-MappingTypeB and the transform precoder is disabled (e.g., CP-OFDM is configured), or if the transform precoder is enabled (e.g., DFT-S-OFDM is configured), or if maxRank=1, this field takes zero (0) bits. Otherwise, the PTRS-DMRS association (and the second PTRS-DMRS association) field takes two (2) bits for indicating the association between PTRS port(s) and DMRS port(s).

With reference to the DMRS sequence initialization field, the DMRS sequence initialization field is a 1-bit field and only exists when CP-OFDM is configured.

It will be understood that whether one or more of the aforementioned WDFs exist in a particular DCI depends on the DCI format. The WDF sizes are restricted in the uplink (UL) DCI with respect to the waveform type indicated by the 1-bit DWS field, which can cause DCI payload size misalignment between DFT-S-OFDM and CP-OFDM. In the 3GPP specification, the number of DCIs with different payload sizes monitored in a single network coverage cell is limited to case the UE implementation of the DCIs. Therefore, different DCI payload sizes resulting from DWS between CP-OFDM and DFT-S-OFDM, which comprise differing DCI field sizes, must be aligned.

In 5G communication networks, one or more UEs associated with a network coverage cell served by a RAN node (e.g., a gNB) are assigned a temporary identifier called a cell (C)-RNTI. A C-RNTI is used to scramble cyclic redundancy check (CRC) bits of a DCI for a particular UE. Configured scheduling (CS)-RNTIs are identifiers used in 5G communication networks as part of CS resource allocation and can also be used to scramble the CRC bits of a DCI. CS-RNTIs enable the RRC layer to define the periodicity of the CS grant. The CS resource can then be reused according to the periodicity defined by the RRC layer of the 5G network. This scrambling of the CRC bits associated with the DCI by the C-RNTI or CS-RNTI is used as a way to uniquely address one or more UEs communicating in a particular network coverage cell. It will be understood that throughout the present disclosure when a particular DCI message is described to be scrambled by a particular RNTI (e.g., a C-RNTI or CS-RNTI) it is indeed the CRC bits associated with particular DCI message that are being scrambled for the reasons described herein and such language use is employed herein for efficiency of description and not of limitation.

In scenarios in which the UL scheduling DCI is scrambled by CS-RNTI, a UE can distinguish between whether the DCI is used for activating CG Type 2 or for scheduling a retransmission of CG Type 2 (which is also considered as a dynamic grant (DG) UL transmission) by extracting the NDI bit field. Said differently, in scenarios in which the UL scheduling DCI is scrambled by CS-RNTI, the NDI bit field can signal whether the DCI is an activation of a configured transmission or a retransmission. However, the RRC parameters for CG Type 2 and DG DCI differ, meaning that the DCI fields before the NDI field might have different sizes since they depend on the RRC parameters. Consequently, the UE will be uncertain about the position of the NDI field. Thus, the UE will not be able to extract the NDI bit and differentiate between CG Type 2 activation DCI and DG DCI scheduling a retransmission.

To solve this issue, a clause was introduced in the current 3GPP specification to ensure that the NDI field location is fixed in the DCI. However, this clause impacts DCI size alignment between a DCI that indicates DFT-S-OFDM and a DCI that indicates CP-OFDM in case the alignment is done per format, in case DWS is used. For example, in a first scenario, suppose a DCI scrambled by C-RNTI (referred to as C-RNTI DCI hereinafter), which supports DWS, and a DCI scrambled by CS-RNTI (referred to as CS-RNTI DCI hereinafter), which does not support DWS (e.g., CG Type 2 activation DCI), are applied in the same network coverage cell. Based on the aforementioned 3GPP clause, all DCI fields in the CS-RNTI DCI should have a smaller, or same, size as the corresponding field in C-RNTI DCI. As such, any DCI field in the C-RNTI DCI that depends on a waveform of a transmission indicated by DWS field (e.g., a WDF) will constraint the size of the corresponding field in CS-RNTI DCI. For example, the C-RNTI DCI with DWS field indicating DFT-S-OFDM, which supports only frequency resource allocation Type 1 and thereby constrains the size of the FDRA field of CS-RNTI DCI to support indication of only frequency resource allocation Type 1. However, the size of the FDRA field is larger for indicating frequency resource allocation Type 0 and smaller for indicating frequency resource allocation Type 1. Therefore, constraining the CS-RNTI DCI in this way violates the aforementioned 3GPP clause.

In a second scenario, suppose a C-RNTI DCI, which supports DWS, and a CS-RNTI DCI, which supports DWS (e.g., DG DCI scheduling a retransmission), are applied in the same network coverage cell. Unless the DWS field in the CS-RNTI DCI indicates DFT-S-OFDM, otherwise the WDF sizes will also be enforced by the corresponding fields in C-RNTI DCI causing a conflict in the position of the NDI field and will therefore violate the aforementioned 3GPP clause.

As described herein with reference to the two aforementioned scenarios, DCI size alignment per format presents a problem since WDFs in C-RNTI DCI may constrain the size of the respective WDF in CS-RNTI DCI. There are four primary existing options identified in 3GPP discussions for DCI payload size alignment in case DWS is used: DCI size alignment per field, DCI size alignment per format, DCI size alignment per field for fields preceding to an NDI and per format for the fields succeeding to the NDI field, and DCI size alignment executed for DCIs addressed to a CS-RNTI. In DCI size alignment per field, zero-padding (e.g., padding a particular DCI field with bits having a value of 0) is applied at the end of each at the end of each field, which is used if the field sizes are misaligned between the DCI that scrambled by C-RNTI and the DCI that scrambled by CS-RNTI. In DCI size alignment per format, zero-padded bits are applied at the end of the DCI payload, which is used for ensuring a limited number of total DCI sizes to be considered by UE.

However, the majority of the previously proposed options for DCI alignment require modification of current 3GPP specification rules. For example, due to the current protocols in the 3GPP specification, DCI size alignment per field between various DCIs that are scrambled by C-RNTI and CS-RNTI respectively would require modifications of the 3GPP specification because, for instance, such an alignment may impact the position of the corresponding NDI fields between the various DCIs. Furthermore, at least one of the previously proposed options for DCI alignment (e.g., DCI alignment per field) will incur additional DCI overhead whenever a new WDF is introduced (e.g., an enhancement or feature field related to DFT-S-OFDM is introduced). It is therefore desirable to have a method for aligning DCIs without violating current 3GPP specifications and/or introducing additional DCI overhead which can adversely impact network and/or UE performance.

An example embodiment of the present disclosure provides an improved DCI size alignment solution which does not violate current 3GPP DCI alignment per field protocols between DCI scrambled C-RNTI and DCI scrambled by CS-RNTI and does not introduce additional DCI overhead. An embodiment achieves this by executing methods that apply zero-padded bits per field or per format based on a DCI scrambling type of the current DCI (e.g., C-RNTI or CS-RNTI) and a waveform indicated by the preceding DCI that is scrambled by C-RNTI. Based at least partially on the DCI scrambling type and the waveform, a UE can determine the zero-padded bits that were applied by the RAN node (e.g., the gNB) to the received DCI such that the UE can determine/decode the WDFs associated with the DCI accordingly. Thus, an example embodiment of the present disclosure enables smaller DCI payload size (and, consequently, better coverage performance) and can adapt to future introductions of WDFs for DFT-S-OFDM (e.g., if an enhancement or feature field related to DFT-S-OFDM is introduced) without impacting the current 3GPP specification DCI size alignment per field protocols.

An embodiment of the present disclosure provides a method in which a network element (e.g., a gNB in a 5G network) can indicate and/or configure a current DCI based at least on the waveform type indicated by a most recent DCI scrambled by a particular RNTI type (e.g., scrambled by C-RNTI or CS-RNTI) received by a particular UE prior to transmitting the current DCI to the particular UE. For example, the network element (e.g., gNB) can determine to apply zero-padded bits to the current DCI per field or per format or both depending on the RNTI scrambled by the current DCI and the waveform type indicated by the most recent DCI scrambled by C-RNTI prior to the current DCI.

For a current DCI scrambled by C-RNTI, zero-padded bits for WDFs are applied at the end of the DCI payload. However, for a current DCI scrambled by CS-RNTI, application of the zero-padded bits is dependent at least on the DWS waveform type indicated by the most recent DCI scrambled by C-RNTI and a waveform of a transmission associated with the current DCI. For example, in various embodiments, if the DWS waveform type indicated by a most recent DCI scrambled by C-RNTI is CP-OFDM, then the network (e.g., by way of the gNB) can apply zero-padded bits to the current DCI per field. Alternatively, if the DWS waveform indicated by the most recent DCI scrambled by C-RNTI is DFT-S-OFDM, then zero-padded bits will be added to the current DCI after the last DCI field and will be dependent on any size differences between the WDFs of the current DCI (e.g., the DCI scrambled by CS-RNTI) and the corresponding WDFs of the most recent DCI scrambled by C-RNTI. As will be described herein, in circumstances in which the WDFs of the current DCI scrambled by CS-RNTI and the corresponding WDFs of the most recent DCI scrambled by C-RNTI indicating DFT-S-OFDM differ in size (e.g., in case the waveform of the transmission associated with the current DCI is CP-OFDM), the networking element (e.g., the gNB) can partition the WDFs of the current DCI scrambled by CS-RNTI such that DCI fields of both the current and most recent DCI align and the NDI field remains in the correct position.

In various embodiments, the respective UE can receive a DCI message and determine the positions of the zero-padded bits (e.g., as applied by the gNB) based in part on the waveform type indicated by the most recent DCI message scrambled by C-RNTI. Determining the most recent DCI message scrambled by C-RNTI is a key factor in the methods described herein for both network elements (e.g., gNBs) and UEs. For example, the most recent DCI message scrambled by C-RNTI can be used for letting an RAN node (e.g., a gNB) correctly apply zero-padded bits to a second (e.g., current) DCI that has been scrambled by CS-RNTI such that the DCI fields of the most recent DCI scrambled by C-RNTI and the second DCI message scrambled by CS-RNTI can correctly align. Similarly, the most recent DCI message scrambled by C-RNTI can be used by a particular UE to determine the one or more positions of one or more respective DCI fields (e.g., WDFs) associated comprising zero-padded bits applied to a second DCI message that has been scrambled by CS-RNTI and received from a particular RAN node (e.g., a gNB).

For example, if the respective UE determines that the DCI is scrambled with C-RNTI, the UE will know that the position of the zero-padded bits is always at the end of the DCI. As such, the UE determines the DWS field for the DCI scrambled with C-RNTI and then determines the one or more WDFs associated with the DCI. Alternatively, if the UE determines that the DCI is scrambled with CS-RNTI, the UE will determine the DWS waveform type of the most recent DCI scrambled by C-RNTI. If the DWS waveform type indicated by the most recent DCI scrambled by C-RNTI is CP-OFDM, the UE will know that the zero-padded bits are applied by field. Alternatively, if the respective UE determines that the DWS waveform type indicated by the most recent DCI scrambled by C-RNTI is DFT-S-OFDM, the UE will know that the zero-padded bits are at the end of the DCI payload and that there is the possibility of WDF partitioning (e.g., the one or more WDFs associated with the DCI may be divided into two or more parts). The UE can then determine the NDI field for the DCI scrambled with CS-RNTI (e.g., the current DCI), as well as the DWS field in case NDI=1 (or RRC configuration of waveform for CG Type 2 in case NDI=0). If the DWS field (or RRC config of waveform for CG Type 2) indicates CP-OFDM and the waveform type indicated by the most recent DCI scrambled by C-RNTI is DFT-S-OFDM, the UE will know to determine whether the WDFs are partitioned. As such, the UE can determine the WDFs from at least the first and second partitioned parts of the WDFs. Otherwise, the UE can directly determine the WDFs. In various embodiments, the respective UE can apply the determined WDFs associated with the DCI for the scheduled/activated UL transmission(s) to the RAN node (e.g., the gNB) associated with the particular network coverage cell.

FIG. 1 illustrates a communication system 100 configured in accordance with at least some embodiments of the present disclosure. However, it is to be appreciated that embodiments are not limited to the network configurations illustrated herein or otherwise described below. It is to be understood that the elements shown in communication system 100 are intended to represent a primary function provided within the system. As such, the blocks shown in FIG. 1 reference specific elements in 5G networks that provide the primary functions. However, other network elements may be used to implement some or all of the primary functions represented. Also, it is to be understood that not all functions of a 5G network are depicted in FIG. 1. Rather, functions that facilitate an explanation of illustrative embodiments are represented.

By way of example, the communication system 100 may be deployed within a radio access architecture. However, the system may be deployed in other applications including within other communication networks including, for example, LTE advanced (LTE-A), a universal mobile telecommunications system (UMTS) radio access network (UTRAN or E-UTRAN), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof. Any access network (AN) eligible to access the 5G core network such as an untrusted Non 3GPP access terminated at a Non-3GPP interworking function (N3IWF), a trusted Non-3GPP access terminated at a trusted non-3GPP gateway function (TNGF) or a Wireline access terminated at a wireless access gateway function (W-AGF) may be used instead of the NG RAN/gNB. Moreover, although described herein in conjunction with a 5G core network, the method, apparatus, and computer program product of certain example embodiments may be employed in conjunction with other technologies, such as a 6G network or the like.

One or more UEs 102a-n can be configured to be in a wireless connection on one or more communication channels in a cell with a radio access network (RAN) node, such as a gNB. The physical link from a UE 102a to a gNB is called the uplink or reverse link and the physical link from the gNB to the UE 102a is called the downlink or forward link. It should be appreciated that the gNBs, or their functionalities may be implemented by using any node, host, server, or access point (AP) or other entity suitable for such a usage. Furthermore, one or more UEs 102a-n can be configured to be in a wireless connection to one or more other UEs 102a-n such as, for example, via a Sidelink channel.

A communications system typically comprises more than one gNB, in which case the gNBs may also be configured to communicate with one another over links, wired or wireless, designed for the purpose. These links may be used for signaling purposes. The gNB is a computing device configured to control the radio resources of the communication system to which the gNB is coupled. The gNB may also be referred to as a base station, an access point or any other type of interfacing device including a relay station capable of operating in a wireless environment. The gNB includes or is coupled to one or more transceiver(s). From the transceivers of the gNB, a connection is provided to an antenna unit that establishes bi-directional radio links to UEs. As such, the transceivers of the gNB and the transceivers of the UEs may include transmitters and receivers configured to communicate via a channel. Although reference is made to a gNB herein, this is by way of example, but not of limitation, as other types of AN nodes may alternatively be employed.

Accordingly, as shown, the communication system 100 comprises one or more UEs 102a-n that communicate, such as via an air interface, with a AN node 104. In some embodiments, the AN node 104 is a RAN node. The one or more UEs 102a-n may be a mobile station, and such a mobile station may comprise, by way of example, a mobile telephone, a computer, or any other type of communication device. The terms "user equipment (UE)," "user device," "computing device," or "apparatus" as used herein are therefore intended to be construed broadly, so as to encompass a variety of different types of mobile stations, subscriber stations or, more generally, communication devices, including examples such as a combination of a data card inserted in a laptop or other equipment.

The one or more UEs 102a-n may also refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a UE 102a may also be a nearly exclusive uplink only device, of which an example is a camera or video camera loading images or video clips to a network. A UE 102a may also be a device having the capability to operate in an IoT network, which is a scenario in which objects are provided with the ability to transfer data over a network without requiring human-to-human or human-to-computer interaction. The UE 102a (or in some embodiments a layer 3 relay node) is configured to perform one or more user device functionalities. The UE 102a may also be called a subscriber unit, mobile station, remote terminal, access terminal, user terminal or user equipment just to mention but a few names or apparatuses.

In one embodiment, one or more UEs 102a-n are comprised of a Universal Integrated Circuit Card (UICC) and Mobile Equipment (ME). The UICC is the user-dependent part of the UE and contains at least one Universal Subscriber Identity Module (USIM) and appropriate application software. The USIM securely stores the International Mobile Subscriber Identity (IMSI) number and its related key, which are used to identify and authenticate subscribers to access networks. The ME is the user-independent part of the UE and contains terminal equipment (TE) functions and various mobile termination (MT) functions.

The AN node 104 is illustratively part of a RAN of the communication system 100. In a 5GS network, the AN node 104 is typically implemented by an gNB. Such an access network may comprise, for example, a plurality of base stations which may include one or more gNBs (which may also be split in a centralized unit (CU) and a distributed unit (DU) part) and/or other AN node types, such as evolved node Bs (eNBs), node Bs, base stations (BS) and/or N3IWF, or any other types of access nodes such as WLAN access points, as well as one or more associated radio network control functions. The base stations and radio network control functions may be logically separate entities, but in a given embodiment may be implemented in the same physical network element, such as, for example, a base station router or femto cellular access point. As will be appreciated by one of skill in the art, any variety of AN nodes and/or access nodes may also implement similar operations, functions, etc.

In some example embodiments, the AN node 104 is operatively coupled to a core network function 106, such as via an NG interface. The core network function 106 may include an access and mobility management function (AMF), session management function (SMF), representative network function (NF-X), or any of core network function. A core network function 106 may be an element of the core network (CN) part of the communication system 100 that is responsible for one or more associated operations.

5G enables using multiple input, multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors, and real-time control. 5G has multiple radio interfaces, e.g., below 6 GHz or above 24 GHz, cmWave and mmWave, and is integrable with existing legacy radio access technologies, such as the LTE. Integration with the LTE may be implemented as a system where macro coverage is provided by the LTE and 5G radio interface access comes from small cells by aggregation to the LTE. In other words, 5G can support both inter-RAT operability (such as LTE-5G) and inter-RI operability (inter-radio interface operability, such as below 6 GHz-cmWave, 6 or above 24 GHZ-cm Wave and mmWave).

The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets, and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications, etc.).

FIG. 2 illustrates an example of an apparatus 200 that may be configured to function as, or may be embodied by, a network entity, such as a UE 102a, UE, AN node 104, AMF, SMF and/or NF-X. As shown in FIG. 2, the apparatus 200 includes, is associated with or is in communication with processing circuitry 202, a memory device 206, and a communication interface 204. The processing circuitry 202 may be in communication with the memory device via a bus for passing information among components of the apparatus 200. The memory device 206 may be non-transitory and may include, for example, one or more volatile and/or non-volatile memories. In other words, for example, the memory device 206 may be an electronic storage device (e.g., a computer readable storage medium) comprising gates configured to store data (e.g., bits) that may be retrievable by a machine (e.g., a computing device like the processing circuitry). The memory device 206 may be configured to store information, data, content, applications, instructions, or the like for enabling the apparatus to carry out various functions in accordance with an example embodiment of the present disclosure. For example, the memory device 206 could be configured to buffer input data for processing by the processing circuitry 202. Additionally or alternatively, the memory device 206 could be configured to store instructions for execution by the processing circuitry 202.

The apparatus 200 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment on a single chip or as a single "system on a chip." As such, in some cases, a chip or chipset may constitute means for performing one or more operations for providing the functionalities described herein.

The processing circuitry 202 may be embodied in a number of different ways. For example, the processing circuitry 202 may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 202 may be configured to execute instructions stored in the memory device 206 or otherwise accessible to the processing circuitry 202. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry 202 is embodied as an executor of instructions, the instructions may specifically configure the processor to perform the algorithms and/or operations described herein when the instructions are executed. However, in some cases, the processing circuitry 202 may be a processor of a specific device (e.g., an image or video processing system) configured to employ an embodiment of the present disclosure by further configuration of the processing circuitry by instructions for performing the algorithms and/or operations described herein. The processing circuitry 202 may include, among other things, a clock, an arithmetic logic unit (ALU) and logic gates configured to support operation of the processing circuitry.

The communication interface 204 may be any means such as a device or circuitry embodied in either hardware or a combination of hardware and software that is configured to receive and/or transmit data from/to a network and/or any other device (e.g., a particular UE 102a, UE, and/or the like) or module in communication with the apparatus. In this regard, the communication interface 204 may include, for example, an antenna (or multiple antennas) and supporting hardware and/or software for enabling communications with a wireless communication network. Additionally, the communication interface 204 can embody and/or integrate with one or more RF and/or wireless transceivers, where each wireless transceiver includes a transmitter to transmit signals and a receiver to receive signals. The one or more RF and/or wireless transceivers can be configured for facilitating communication on a 4G/LTE network, a 5G network, and/or the like. Additionally, the one or more RF and/or wireless transceivers can be configured for facilitating communication on various respective communication networks. The one or more RF and/or wireless transceivers receive signals or data and/or transmit or send signals and/or data. In various embodiments, processing circuitry 202 can control the antenna(s) and/or the one or more RF and/or wireless transceivers to receive, send, broadcast, or transmit signals and/or data. Additionally or alternatively, the communication interface 204 may include the circuitry for interacting with the antenna(s) and/or the one or more RF and/or wireless transceivers to cause transmission of signals via the antenna(s) or to handle receipt of signals received via the antenna(s). Additionally or alternatively, in some environments, the communication interface 204 may support wired communication. As such, for example, the communication interface may include a communication modem and/or other hardware/software for supporting communication via cable, digital subscriber line (DSL), universal serial bus (USB) or other mechanisms.

FIGS. 3A-B illustrate an example alignment of two DCI messages configured in accordance with one or more example embodiments of the present disclosure. Specifically, FIGS. 3A-B depict a scenario in which a network element (e.g., a gNB of a 5G network) indicates and/or configures (e.g., by way of an apparatus 200 associated with a gNB) various DCI fields associated with the DCI messages 300 and 301 respectively based on the proposed DCI alignment rules described herein. The network element can configure the various DCI fields and apply zero-padded bits to the DCI message 301 per DCI field based at least in part on the waveform type indicated by the most recent DCI message scrambled by C-RNTI (e.g., the DCI message 300) such that both the DCI messages 300 and 301 align.

As shown, the DCI messages 300 and 301 depicted in FIGS. 3A and 3B respectively comprise DCI fields 302-312.

In various embodiments, a particular DCI field (e.g., DCI field 302) can be associated with a particular portion of control information bits. For example, the DCI field 302 is associated with a DCI identifier, the DCI field(s) 304*a-m* are associated with one or more respective WDFs, the DCI field 306 is associated with an NDI, the DCI field 308 is associated with a DWS indicator, the DCI field 310 is associated with the last DCI field of a particular DCI message of a DCI format (e.g., DCI message 300), and the DCI field(s) 312*a-c* are associated with the zero-padded bits applied to a particular DCI message (e.g., DCI message 301).

In this example, the DCI message 300 depicted in FIG. 3A is the most recent DCI message scrambled by C-RNTI that is known to a particular gNB and is indicating that the CP-OFDM waveform type is being used for UL transmissions to be transmitted by one or more UEs (e.g., as indicated by the DCI field 308 associated with the DWS indicator). Determining the most recent DCI message scrambled by C-RNTI is a key factor in the methods described herein as the most recent DCI message scrambled by C-RNTI (e.g., DCI message 300) can be used for letting an RAN node (e.g., an node 104 implemented as a gNB) correctly apply zero-padded bits to a second (e.g., current) DCI message that has been scrambled by CS-RNTI (e.g., DCI message 301) such that the DCI fields (e.g., DCI fields 302-312) of the most recent DCI message scrambled by C-RNTI (e.g., the DCI message 300) and the second (e.g., current) DCI message scrambled by CS-RNTI (e.g., the DCI message 301) can correctly align. Similarly, the most recent DCI message scrambled by C-RNTI (e.g., the DCI message 300) can be used by a particular UE (e.g., a UE 102*a*) to determine the one or more positions of one or more respective DCI fields associated with zero-padded bits applied to a second (e.g., current) DCI message that has been scrambled by CS-RNTI (e.g., the DCI fields 312*a*-312*c* of DCI message 301) and received from a particular RAN node (e.g., a gNB).

As shown in the example illustrated in FIGS. 3A-B, a particular RAN node (e.g., the AN node 104 implemented as a gNB) can configure a DCI message scrambled by CS-RNTI indicating the use of the DFT-S-OFDM waveform type (e.g., the DCI message 301) to be transmitted to a particular UE 102*a* based on a most recent DCI message scrambled by C-RNTI indicating CP-OFDM (e.g., the DCI message 300). Because the most recent DCI message scrambled by C-RNTI indicates CP-OFDM (e.g., the DCI message 300), the particular RAN node knows to apply zero-padded bits to the DCI message scrambled by CS-RNTI indicating DFT-S-OFDM per DCI field such that the respective DCI fields (e.g., DCI fields 302-312) of the second (e.g., current) DCI message scrambled by CS-RNTI indicating DFT-S-OFDM (e.g., the DCI message 301) and the most recent DCI message scrambled by C-RNTI indicating CP-OFDM (e.g., the DCI message 300) align with one another.

FIGS. 4A-B illustrate another example alignment of two DCI messages configured in accordance with one or more example embodiments of the present disclosure. Specifically, FIGS. 4A-B depict a scenario in which a network element (e.g., a gNB of a 5G network) indicates and/or configures (e.g., by way of an apparatus 200 associated with a gNB) various DCI fields associated with the DCI messages 400 and 401 respectively based on the proposed DCI alignment rules described herein. The network element can configure the various DCI fields and apply zero-padded bits to the DCI message 401 per DCI field based at least in part on the waveform type indicated by the most recent DCI message scrambled by C-RNTI (e.g., the DCI message 400) and a waveform type of a transmission associated with the second (e.g., current) DCI message (e.g., DCI message 401) such that both the DCI messages 400 and 401 align.

The DCI messages 400 and 401 depicted in FIGS. 4A and 4B respectively comprise DCI fields 402-416. In various embodiments, a particular DCI field (e.g., DCI field 402) can be associated with a particular portion of control information bits. For example, the DCI field 402 is associated with a DCI identifier, the DCI field(s) 404*a-m* are associated with one or more respective WDFs, the DCI field 406 is associated with an NDI, the DCI field 408 is associated with a DWS indicator, the DCI field 410 is associated with the last DCI field of a particular DCI message of a DCI format (e.g., DCI message 400), the DCI field 412 is associated with the zero-padded bits applied to a particular DCI message (e.g., DCI message 400), and the DCI fields 414*a-m* and 416*a-m* are associated with the first and second parts of a partitioned WDF respectively.

In this example, the DCI message 400 depicted in FIG. 4A is the most recent DCI message scrambled by C-RNTI that is known to a particular RAN node (e.g., the AN node 104 implemented as a gNB) and is indicating that the DFT-S-OFDM waveform type is being used for UL transmissions to be transmitted by one or more UEs (e.g., as indicated by the DCI field 408 associated with the DWS indicator). The particular RAN node can configure a second (e.g., current) DCI message scrambled by CS-RNTI indicating the use of the CP-OFDM waveform type (e.g., the DCI message 401 in FIG. 4B) of a transmission to be transmitted by a particular UE 102*a* based on the most recent DCI message scrambled by C-RNTI indicating DFT-S-OFDM (e.g., the DCI message 400).

As shown in FIG. 4B, if the second (e.g., current) DCI message (e.g., the DCI message 401) has NDI=0 (e.g., the DCI field 406 associated with the NDI is equal to 0) and the RRC configured waveform type for CG is CP-OFDM, or if the NDI=1 and the DWS field indicates CP-OFDM (e.g., the DCI field 408 associated with the DWS indicates CP-OFDM), the particular RAN node applies zero-padded bits per DCI field for all non-WDFs in the second (e.g., current) DCI message scrambled by CS-RNTI (e.g., the DCI message 401). Furthermore, for any WDF that has larger size for the DCI message 401 (e.g., $N_{CP}$ bits) compared to the corresponding WDF of the DCI message 400 indicating DFT-S-OFDM (e.g., $N_{DFT}<N_{CP}$), the $N_{CP}$ bits are partitioned into two parts. For example, as shown in FIG. 4B. The $N_{CP}$ bits are partitioned such that each of the DCI fields 414*a-m* is associated with a first part of a respective partitioned WDF and the corresponding each of DCI fields 416*a-m* are associated with a second part of the respective partitioned WDF.

The first part of a respective partitioned WDF (e.g., as indicated by the DCI fields 414*a-m*) includes $N_{DFT}$ bits and can be conveyed by the corresponding DCI field. The second part of a respective partitioned WDF (e.g., as indicated by the DCI fields 416*a-m*) includes the remaining $N_{CP}-N_{DFT}$ bits and can be added after the last field of the DCI format (e.g., the DCI field 410 associated with the last DCI field) rather than padding with zeros. In this case, the second part can be considered as a field or zero-padding bits depending on the WDF is partitioned or not.

As shown in FIG. 4B, if it is determined that a current DCI message (e.g., DCI message 401) indicating CP-OFDM comprises multiple WDFs that have a larger size compared to the corresponding WDFs of the most recent DCI message indicating DFT-S-OFDM (e.g., DCI message 400) and the multiple WDFs must be partitioned, the order of the second parts of the multiple respective partitioned WDFs will follow the order of the WDFs associated with the particular DCI format. For example, as shown in FIG. 4B, the DCI fields 416*a*-*m* associated with a second part of a respective partitioned WDF maintain the same order as the DCI fields 414*a*-*m* associated with a first part of the respective partitioned WDF.

In various embodiments, in a scenario in which the current DCI message has NDI=0 (e.g., the DCI field 406 associated with the NDI is equal to 0) and the RRC configured waveform type for CG is DFT-S-OFDM, or if NDI=1 (DG) and the DWS field indicates DFT-s-OFDM (e.g., the DCI field 408 associated with the DWS indicates DFT-S-OFDM), the particular RAN node applies zero-padded bits to any non-WDF DCI fields of the DCI message scrambled by CS-RNTI indicating DFT-s-OFDM such that each DCI field aligns to the DCI fields of the DCI message scrambled by C-RNTI (e.g., DCI message 400). In such a scenario, no zero-padded bits are needed for the WDFs of the DCI message scrambled by CS-RNTI indicating DFT-s-OFDM since the WDFs are the same for C-RNTI and CS-RNTI in this instance.

FIGS. 5A-C illustrate a flowchart depicting a method 500 for providing compact DCI size alignment in accordance with one or more example embodiments of the present disclosure. The method 500 can be implemented, for example, by one or more components of an apparatus 200. In various embodiments the apparatus 200 can be embodied can be embodied by a networking element (e.g., a gNB). In various other embodiments, the apparatus 200 can be embodied by a UE 102*a*. Additionally or alternatively, the apparatus 200 can be embodied by any other particular computing device (e.g., smartphone, laptop, tablet computer, networking device, etc.) associated with a particular communications network. It will be appreciated that the apparatus 200 may be configured to perform the method 500 with the reference to the components of the apparatus 200 again being provided by way of example but not of limitation. As such, the apparatus 200 includes means, such as the processing circuitry 202, at least one processor, communication interface 204, at least one memory device 206, and/or the like, configured to perform the various operations associated with the method 500.

The method 500 begins at operation 502 in which the apparatus 200 is configured to receive a current DCI message. At operation 504, the apparatus 200 is configured to determine whether the current DCI message is scrambled by C-RNTI. If yes, the method 500 proceeds to operation 506. If no, the method 500 proceeds to operation 508.

At operation 506, the apparatus 200 is configured to, for one or more DCI fields associated with one or more WDFs, apply zero-padded bits at the end of the current DCI message. As described herein, DCI message formats that have been scrambled by C-RNTI append any necessary zero-padded bits at the end of the DCI message after the last DCI field (e.g., the DCI field 310). The apparatus is configured to cause transmission of the DCI message (e.g., the DCI message 300) to a particular UE 102*a* via a downlink channel.

At operation 508, the apparatus 200 is configured to determine whether the current DCI message is scrambled by CS-RNTI. If the current DCI message is not scrambled by CS-RNTI, the apparatus 200 is configured to directly determine the WDFs associated with the current DCI message and cause transmission of the current DCI message to the UE 102*a*. If the apparatus 200 determines that the current DCI message is scrambled by CS-RNTI, the method 500 proceeds to operation 510.

At operation 510, the apparatus 200 is configured to determine whether a most recent DCI message associated with the particular UE 102*a* was scrambled by C-RNTI and indicated CP-OFDM as the designated waveform type associated with a transmission to/from the UE 102*a*. If no, the method 500 proceeds to operation 514. If yes, the method 500 proceeds to operation 512.

At operation 512, the apparatus 200 is configured to apply zero-padded bits per DCI field to the current DCI message (e.g., as depicted in FIG. 3B) for aligning all DCI fields of the current DCI message scrambled by CS-RNTI to those of the most recent DCI message scrambled by C-RNTI with CP-OFDM waveform type. Because the most recent DCI message scrambled by C-RNTI indicates CP-OFDM (e.g., the DCI message 300), the apparatus 200 knows to apply zero-padded bits to the current DCI message scrambled by CS-RNTI indicating DFT-S-OFDM per DCI field such that the respective DCI fields (e.g., DCI fields 302-312) of the current DCI message scrambled by CS-RNTI indicating DFT-S-OFDM (e.g., the DCI message 301) and the most recent DCI message scrambled by C-RNTI indicating CP-OFDM (e.g., the DCI message 300) align with one another. The apparatus 200 is configured to cause transmission of the current DCI message scrambled by CS-RNTI to the UE 102*a*.

At operation 514, the apparatus 200 is configured to, in the event that the most recent DCI message associated with the particular UE 102*a* was scrambled by C-RNTI and indicated DFT-S-OFDM as the designated waveform type associated with a transmission to/from the UE 102*a* (e.g., DCI message 400), assume that the WDFs associated with the current DCI message scrambled by CS-RNTI have the same size (e.g., bit-width) of the respective corresponding WDFs of the most recent DCI message scrambled by C-RNTI and indicating DFT-S-OFDM. At operation 516, the apparatus 200 is configured to read the DCI fields associated with the NDI and DWS (e.g., the respective DCI fields 406 and 408 of the DCI message 401).

At operation 518, the apparatus 200 is configured to determine whether the current DCI message has NDI=0 (e.g., the DCI field 406 associated with the NDI is equal to 0) and the RRC configured waveform type for CG is CP-OFDM, or if the NDI=1 and the DWS field indicates CP-OFDM (e.g., the DCI field 408 associated with the DWS indicates CP-OFDM). If yes, the method 500 proceeds to operation 522. If no, the method 500 proceeds to operation 520.

At operation 520, the apparatus 200 is configured to apply zero-padded bits to any non-WDF DCI fields of the current DCI message scrambled by CS-RNTI such that each DCI field of the current DCI message aligns to the DCI fields of the most recent DCI message scrambled by C-RNTI. For example, in a scenario in which the NDI=0 (e.g., the DCI field 406 associated with the NDI is equal to 0) and the RRC configured waveform type for CG is DFT-S-OFDM, or if NDI=1 (DG) and the DWS field indicates DFT-s-OFDM (e.g., the DCI field 408 associated with the DWS indicates DFT-S-OFDM), the apparatus 200 can apply zero-padded bits to any non-WDF DCI fields of the current DCI message scrambled by CS-RNTI indicating DFT-s-OFDM such that each DCI field of the current DCI message aligns to the DCI fields of the most recent DCI message scrambled by C-RNTI (e.g., DCI message 400). In such a scenario, no zero-padding is needed for the WDFs of the DCI message scrambled by CS-RNTI indicating DFT-s-OFDM since the WDFs are the same for C-RNTI and CS-RNTI in this instance. The apparatus 200 is configured to cause transmission of the current DCI message scrambled by CS-RNTI to the UE 102*a*.

At operation 522, the apparatus 200 is configured to apply zero-padded bits per DCI field for all non-WDFs in the current DCI message scrambled by CS-RNTI and indicating the use of the CP-OFDM (e.g., the DCI message 401). At operation 524, the apparatus 200 is configured to determine whether at least one WDF of the current DCI message scrambled by CS-RNTI and indicating CP-OFDM (e.g., DCI message 401) has a larger size than a corresponding WDF of the most recent DCI message indicating DFT-S-OFDM (e.g., DCI message 400). If no, the apparatus 200 can determine that the respective DCI fields of the current DCI message scrambled by CS-RNTI and indicating CP-OFDM (e.g., DCI message 401) and the most recent DCI message indicating DFT-S-OFDM (e.g., DCI message 400) are already aligned and, as such, can cause transmission of the DCI message scrambled by CS-RNTI to the UE 102*a*. If yes, the method 500 proceeds to operation 526.

At operation 526, the apparatus 200 is configured to initiate a variable (e.g., $N_{WDFs-L}$) associated with the number of WDFs corresponding to the current DCI message scrambled by CS-RNTI and indicating the use of the CP-OFDM (e.g., the DCI message 401) that have a larger size than a corresponding WDF of the most recent DCI message indicating DFT-S-OFDM (e.g., DCI message 400). The apparatus 200 is also configured to initiate a variable Counter=0. At operation 528, the apparatus 200 is configured to determine whether the value associated with the variable Counter is equal to $N_{WDFs-L}$. If yes, the apparatus 200 is configured to cause transmission of the current DCI message scrambled by CS-RNTI and indicating the use of the CP-OFDM (e.g., the DCI message 401) to the UE 102*a*. If no, the method proceeds to operation 530. At operation 530, the apparatus 200 is configured to increment the value of the variable Counter by one.

At operation 532, the apparatus 200 is configured to partition any number of WDFs corresponding to the current DCI scrambled by CS-OFDM and indicating CP-OFDM that have a larger size (e.g., $N_{CP}$ bits) compared to the corresponding WDFs of the most recent DCI indicating DFT-S-OFDM (e.g., $N_{DFT}<N_{CP}$). For example, as shown in FIG. 4B, The $N_{CP}$ bits are partitioned into two parts such that the DCI fields 414*a-m* are associated with a first part of a respective partitioned WDF and the corresponding DCI fields 416*a-m* are associated with a second part of the respective partitioned WDF.

For example, the first part of a respective partitioned WDF (e.g., as indicated by the DCI fields 414*a-m*) includes $N_{DFT}$ bits and can be conveyed by the corresponding DCI field. The second part of a respective partitioned WDF (e.g., as indicated by the DCI fields 416*a-m*) includes the remaining $N_{CP}-N_{DFT}$ bits and can be added after the last field of the current DCI (e.g., the DCI field 410 associated with the last DCI field) rather than adding zeros. As shown in FIG. 4B, if it is determined that the current DCI message (e.g., DCI message 401) indicating CP-OFDM comprises multiple WDFs that have a larger size compared to the corresponding WDFs of the most recent DCI scrambled by C-RNTI and indicating DFT-S-OFDM and the multiple WDFs must be partitioned, the order of the second parts of the multiple respective partitioned WDFs follows the order of the WDFs associated with the particular DCI format. For example, as shown in FIG. 4B, the DCI fields 416*a-m* associated with a second part of a respective partitioned WDF maintain the same order as the DCI fields 414*a-m* associated with a first part of the respective partitioned WDF. After executing the operation 532, the apparatus 200 is configured to iterate through operations 528-530 until the value of the variable Counter is equal to $N_{WDFs-L}$ at which point the apparatus 200 is configured to cause transmission of the current DCI message scrambled by CS-RNTI and indicating the use of the CP-OFDM (e.g., the DCI message 401) to the UE 102*a*.

As described herein, an example embodiment of the present disclosure is able to provide compact DCI alignment per DCI format. An example embodiment of the present disclosure provides an improved DCI alignment per format solution which does not violate current 3GPP DCI alignment per field protocols. As such, an embodiment of the present disclosure does not require any modification to the current rules put forth by the 3GPP specification (e.g., DCI size alignment per field between DCIs that are scrambled by C-RNTI and CS-RNTI). Furthermore, an embodiment of the present disclosure enables smaller DCI payload size (and, consequently, better coverage performance) and can adapt to future introductions of WDFs for DFT-S-OFDM (e.g., an enhancement or feature field related to DFT-S-OFDM is introduced) without impacting the current 3GPP specification DCI size alignment per field protocols. Additionally, an embodiment of the present disclosure avoids potential network coverage degradation for UEs in known poor coverage areas due to larger DCI sizes with redundant zeros which can result in a lower coding rate. Furthermore, an example embodiment of the present disclosure can perform DCI size alignment while avoiding any ambiguity between DCI messages scrambled by C-RNTI or CS-RNTI by utilizing the DWS DCI field to determine a corresponding waveform type (e.g., CP-OFDM or DFT-S-OFDM).

It should be appreciated that the example embodiments described herein are not restricted to the system that is given as an example, such as a 5G system, and that a person skilled in the art may apply the solution to other communication systems. Additionally, although described herein in the context of a UE performing, the method, the method may be performed by other types of apparatus, such as an apparatus associated with and/or in communication with a UE, in accordance with other example embodiments.

Furthermore, implementations of the various techniques described herein may be implemented in digital electronic circuitry, or in computer hardware, firmware, software, or in combinations of them. Implementations may be implemented as a computer program product, e.g., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer, or it may be distributed amongst a number of computers.

A computer program, such as the computer program(s) described herein, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

It will be understood that each block of the flowchart(s) and combination of blocks in the flowchart(s) can be implemented by various means, such as hardware, firmware, processor, circuitry, and/or other communication devices associated with execution of software including one or more computer program instructions. For example, one or more of the procedures described herein can be embodied by computer program instructions. In this regard, the computer program instructions which embody the procedures described herein can be stored, for example, by the memory device 206 of the apparatus 200 or other apparatus employing an embodiment of the present disclosure and executed by the processing circuitry 202. As will be appreciated, any such computer program instructions can be loaded onto a computer or other programmable apparatus (for example, hardware) to produce a machine, such that the resulting computer or other programmable apparatus implements the functions specified in the blocks of the flowchart(s). These computer program instructions can also be stored in a computer-readable memory that can direct a computer or other programmable apparatus to function in a particular manner, such that the instructions stored in the computer-readable memory produce an article of manufacture the execution of which implements the function specified in the blocks of the flowchart(s). The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the blocks of the flowchart(s).

Accordingly, blocks of the flowchart(s) support combinations of means for performing the specified functions and combinations of operations for performing the specified functions for performing the specified functions. It will also be understood that one or more blocks of the flowchart(s), and combinations of blocks in the flowchart(s), can be implemented by special purpose hardware-based computer systems which perform the specified functions, or combinations of special purpose hardware and computer instructions.

In some embodiments, certain ones of the operations described herein may be modified or further amplified. Furthermore, in some embodiments, additional optional operations may be included. Modifications, additions, or amplifications to the operations described herein may be performed in any order and in any combination.

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
at least one processor; and
at least one memory including computer program code, the at least one memory and the computer program code configured to, with the at least one processor, cause the apparatus at least to:
receive, from a network element, a first downlink control information (DCI) message, wherein the first DCI message comprises a plurality of DCI fields;
determine a first radio network temporary identifier (RNTI) type of a first RNTI that is used for scrambling cyclic redundancy check (CRC) bits of the first DCI message;
determine a waveform type indicated by a second DCI message, wherein the second DCI message is a most recent DCI message received by the apparatus prior to the first DCI message, and wherein CRC bits of the second DCI message are scrambled by a second RNTI, and wherein the second RNTI is a cell RNTI (C-RNTI); and
decode the first DCI message based at least in part on the first RNTI type and the waveform type.

2. The apparatus of claim 1, wherein decoding the first DCI message comprises determining the size of one or more waveform dependent fields (WDFs) associated with the first DCI message, wherein the WDFs are comprised in the plurality of DCI fields associated with the first DCI message.

3. The apparatus of claim 1, wherein decoding the first DCI message comprises identifying one or more portions of zero-padded bits associated with the first DCI message.

4. The apparatus of claim 1, wherein decoding the first DCI message further comprises determining whether at least one of the one or more WDFs is partitioned into two parts.

5. The apparatus of claim 3, wherein the computer program code is configured to further cause the apparatus to:
in response to determining that the CRC bits of the first DCI message are scrambled by a C-RNTI:
determine that the respective position of the one or more portions of zero-padded bits is located after a last DCI field of the first DCI message.

6. The apparatus of claim 1, wherein the computer program code is configured to further cause the apparatus to:
in response to determining that the CRC bits of the first DCI message are scrambled by a configured scheduling radio network temporary identifier (CS-RNTI):
determine the second DCI message, wherein the second DCI message is a most recent DCI message received by the apparatus prior to the first DCI message, and wherein the CRC bits of the second DCI message are scrambled by a C-RNTI;

in response to determining the second DCI message:
    determine the waveform type indicated by the second DCI message.

7. The apparatus of claim 6, wherein the computer program code is configured to further cause the apparatus to:
    in response to determining that the waveform type indicated by the second DCI message is a cyclic prefix-orthogonal frequency division multiplexing (CP-OFDM) waveform:
        determine that the respective position of each of the one or more portions of zero-padded bits are located after a respective DCI field of the plurality DCI fields associated with the first DCI message.

8. The apparatus of claim 6, wherein the computer program code is configured to further cause the apparatus to:
    in response to determining that the waveform type indicated by the second DCI message is a discrete Fourier transform spread orthogonal frequency division multiplexing (DFT-S-OFDM) waveform:
        determine that a DCI field of the plurality of DCI fields is a new data indicator (NDI) field, wherein the NDI field indicates whether the first DCI message is an activation for a configured transmission or a retransmission, and wherein a location of the NDI field in the plurality of DCI fields associated with the first DCI message is determined by assuming that sizes of the WDFs located before the NDI field in the first DCI message are of the same sizes of respective WDFs located before an NDI field in the second DCI message associated with DFT-S-OFDM waveform;
        determine that a DCI field of the plurality of DCI fields is a DWS field, wherein the DWS field indicates a respective waveform type of a transmission associated with the first DCI message;
        determine, based in part on the NDI field and the respective waveform type indicated by the DWS field, the waveform type of the transmission associated with the first DCI message;
        in response to determining that the waveform type of the transmission associated with the first DCI message is CP-OFDM:
            determine whether one or more WDFs of the plurality of DCI fields associated with the first DCI message have been partitioned.

9. The apparatus of claim 1, wherein the computer program code is configured to further cause the apparatus to:
    in response to determining that the first DCI message is scrambled by a C-RNTI:
        determine that a DCI field of the plurality of DCI fields is a dynamic waveform switching (DWS) field, wherein the DWS field indicates a respective waveform type of a transmission associated with the first DCI message;
        determine, based in part on the respective waveform type indicated by the DWS field, a respective WDF type associated with each of the WDFs of the plurality of DCI fields associated with the first DCI message; and
        determine, based in part on the respective waveform type indicated by the DWS field, a position associated with each of the respective WDFs associated with the first DCI message.

10. An apparatus comprising:
    at least one processor; and
    at least one memory including computer program code, the at least one memory and the computer program code configured to, with the at least one processor, cause the apparatus at least to:
    determine a first radio network temporary identifier (RNTI) type of a first RNTI that is used for scrambling cyclic redundancy check (CRC) bits of a first DCI message, wherein the first DCI message comprises a plurality of DCI fields;
    determine a waveform type indicated by a second DCI message, wherein the second DCI message is a most recent DCI message caused to be transmitted by the apparatus prior to the first DCI message, and wherein the CRC bits of the second DCI message are scrambled by a second RNTI, and wherein the second RNTI is a cell RNTI (C-RNTI);
    encode the first DCI message based at least in part on the first RNTI type and the waveform type; and
    transmit the first DCI message.

11. The apparatus of claim 10, wherein encoding the first DCI message comprises determining the size of one or more waveform dependent fields (WDFs) associated with the first DCI message, wherein the WDFs are comprised in the plurality of DCI fields associated with the first DCI message.

12. The apparatus of claim 10, wherein encoding the first DCI message comprises applying one or more portions of zero-padded bits to the first DCI message.

13. The apparatus of claim 10, wherein encoding the first DCI message further comprises partitioning one or more waveform dependent fields (WDFs) into two parts, wherein the WDFs are comprised in the plurality of DCI fields associated with the first DCI message.

14. The apparatus of claim 12, wherein the computer program code is configured to further cause the apparatus to:
    in response to determining that the CRC bits of the first DCI message are scrambled by a C-RNTI:
        apply the one or more portions of zero-padded bits after a last DCI field of the first DCI message.

15. The apparatus of claim 10, wherein the computer program code is configured to further cause the apparatus to:
    in response to determining that the CRC bits of the first DCI message are scrambled by a configured scheduling radio network temporary identifier (CS-RNTI):
        determine the second DCI message, wherein the second DCI message is a most recent DCI message caused to be transmitted by the apparatus prior to the first DCI message, and wherein the CRC bits of the second DCI message is scrambled by a C-RNTI;
        in response to determining the second DCI message:
            determine the waveform type indicated by the second DCI message.

16. The apparatus of claim 15, wherein the computer program code is configured to further cause the apparatus to:
    in response to determining that the waveform type indicated by the second DCI message is a cyclic prefix-orthogonal frequency division multiplexing (CP-OFDM) waveform:
        apply each of the one or more portions of zero-padded bits after a respective DCI field of the plurality of DCI fields associated with the first DCI message.

17. The apparatus of claim 15, wherein the computer program code is configured to further cause the apparatus to:
    in response to determining that the waveform type indicated by the second DCI message is a discrete Fourier transform spread orthogonal frequency division multiplexing (DFT-S-OFDM) waveform:
        determine that a DCI field of the plurality of DCI fields is a new data indicator (NDI) field, wherein the NDI field indicates whether the first DCI message is an activation for a configured transmission or a retransmission, and wherein a location of the NDI field in the plurality of DCI fields associated with the first DCI message is determined by assuming sizes of the WDFs located before the NDI field in the first DCI message are of the same sizes of respective WDFs located before an NDI field in the second DCI message associated with DFT-S-OFDM waveform;

determine that a DCI field of the plurality of DCI fields is a DWS field, wherein the DWS field indicates a respective waveform type of a transmission associated with the first DCI message;

determine, based in part on the NDI field and the respective waveform type indicated by the DWS field, the waveform type of the transmission associated with the first DCI message;

in response to determining that the waveform type of the transmission associated with the first DCI message is CP-OFDM:

determine, based in part on the location of the NDI field, whether one or more of the WDFs associated with the first DCI message are larger than one or more corresponding WDFs associated with the second DCI message;

in response to determining that the one or more WDFs associated with the first DCI message are larger than the one or more corresponding WDFs associated with the second DCI message:

partition the one or more WDFs associated with the first DCI message are larger into a first and second respective part; and append the second part of the respective partitioned WDFs after a last DCI field of the first DCI message.

18. A computer-implemented method, comprising:

receiving, from a network element, a first downlink control information (DCI) message, wherein the first DCI message comprises a plurality of DCI fields;

determining a first radio network temporary identifier (RNTI) type of a first RNTI that is used for scrambling cyclic redundancy check (CRC) bits of the first DCI message;

determining a waveform type indicated by a second DCI message, wherein the second DCI message is a most recent DCI message received by the apparatus prior to the first DCI message, and wherein CRC bits of the second DCI message are scrambled by a second RNTI, and wherein the second RNTI is a cell RNTI (C-RNTI); and decoding the first DCI message based at least in part on the first RNTI type and the waveform type.

19. The computer-implemented method of claim 18, wherein decoding the first DCI message comprises determining the size of one or more waveform dependent fields (WDFs) associated with the first DCI message, wherein the WDFs are comprised in the plurality of DCI fields associated with the first DCI message.

20. The computer-implemented method of claim 18, wherein decoding the first DCI message comprises identifying one or more portions of zero-padded bits associated with the first DCI message.

\* \* \* \* \*